Figure 1:
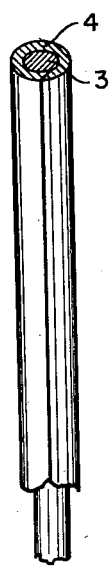

Sept. 30, 1952     H. ROBINSON     2,612,581
WELDING ROD
Filed Feb. 11, 1950

INVENTOR
HAROLD ROBINSON
BY
ATTORNEYS

Patented Sept. 30, 1952

2,612,581

UNITED STATES PATENT OFFICE 2,612,581

WELDING ROD

Harold Robinson, Somerville, N. J., assignor to Air Reduction Company, Incorporated, New York, N. Y., a corporation of New York Application February 11, 1950, Serial No. 143,779

5 Claims. (Cl. 219—8)

This invention relates to aluminum bronze welding including both the production of welding joints of aluminum bronze and also the building of aluminum bronze wear-resistant surfaces and the like.

Aluminum bronze welding as heretofore practiced has generally involved the use of welding rods of aluminum bronze alloy. Aluminum bronze welding alloys usually contain aluminum and copper in the relative proportions by weight of 7.5% to 13% aluminum to 87% to 92.5% copper. Such aluminum bronze alloys, which may also contain up to 5% iron, have excellent strength and wear-resistance properties, and aluminum bronze welding is desirable for many commercial applications.

Serious practical difficulties have been encountered in the preparation of suitable welding rods of aluminum bronze alloy. If more than 9% aluminum is alloyed with the copper it is almost impossible to work the metal to provide welding rods of the various sizes required for commercial welding operations. These higher alloy aluminum bronzes are so difficult to work that it is necessary to resort to a complicated annealing and swaging operation which makes the cost of producing the alloy rods almost prohibitive.

This invention is based on the discovery that an entirely satisfactory homogeneous aluminum bronze weld deposit can be made by employing a composite welding rod composed of copper and aluminum elements fabricated together or otherwise physically united, as distinguished from being fused to form an alloy. I have found that a satisfactory weld deposit of aluminum bronze can be formed by employing such composite welding rods regardless of whether the rod is used as a consuming electrode in a continuous welding operation, as a filler rod in what is known as heliwelding, as a gas welding rod, or as a coated stick electrode.

The principal object of this invention is to provide an improved aluminum bronze welding process and to provide a welding rod for aluminum bronze welding that is less costly and more satisfactory in use than welding rods composed of aluminum and copper fused to provide a rod of aluminum bronze alloy. According to this invention, wires, rods or strips of aluminum and copper, in the proper proportions, are mechanically united under conditions such that the ductile properties of the separate elements of aluminum and copper are preserved throughout the operation of forming the welding rod. Such separate elements are easily fabricated to form a unitary rod and the composite rod may then be used in the same manner as any welding rod, either as a filler rod, as a bare wire electrode, or as a coated electrode.

According to this invention the desired relative quantities of aluminum and copper are simultaneously fed to the welding zone, and, as stated above, I have discovered that the weld metal deposit produced in this manner has all of the characteristics of a completely homogeneous aluminum bronze weld metal deposit.

The cost of producing my improved welding rod is substantially lower than the cost of producing welding rods of aluminum bronze alloy and this is due primarily to the fact that the separate elements of copper and aluminum can be easily worked and drawn either separately or after mechanical union, to form welding rods of the desired size. Furthermore my improved welding rod is much easier to handle during the welding operation. For example, it can be wound on a reel for use in a continuous welding operation, an operation which would not be possible with a high alloy aluminum bronze rod.

My invention is of greatest value in the production of aluminum bronze weld metal deposits containing more than 9% aluminum, because, as noted above, it is extremely difficult to work aluminum bronze alloys containing such high percentages of aluminum, to form aluminum bronze alloy welding rods of the several sizes required for commercial welding operations. This invention is nevertheless valuable in the production of aluminum bronze weld metal deposits having a lower percentage of aluminum, i. e., percentages ranging between 7½ and 9%, because even though aluminum bronze alloys containing such a small percentage of aluminum can be drawn to the desired size without too much difficulty, it is nevertheless expensive to provide such alloy welding rods, because separate alloy heats must be made for each rod composition. According to my invention, it is possible to provide composite rods of any desired composition by using the same aluminum and copper stock. The aluminum may range from 7.5% to as much as 20%.

The welding rods of my invention are composed of two or more elongated elements, at least one being of aluminum and at least one being of copper. It will be understood that reference herein to aluminum is intended to include substantially pure aluminum and also aluminum containing iron or other metals in proportions not materially exceeding 5% by weight. Reference herein to copper is likewise intended to include substantially pure copper and alloys which are predominantly copper, i. e., 95% or more copper. It will be understood that various alloying elements may be added to the aluminum, or to the copper, or to each, or used as a separate component of the rod.

In a typical embodiment of my invention, the welding rods are composed of a core of one of the metals covered by a sheath of the other metal, e. g., a core of aluminum and a sheath of copper, the relative sizes of the core and sheath being such as to give the desired amount of aluminum and copper, respectively, per unit length of the rod. The core and sheath, respectively, are of uniform transverse area throughout so that the relative proportions of aluminum and copper are the same throughout the length of the welding rod. A welding rod of this type which has been used in an automatic welding machine is one having a core of substantially pure aluminum $\frac{1}{8}$ inch diameter drawn through a copper tubing having an inside diameter of $\frac{1}{8}$ inch and an outside diameter of $\frac{3}{16}$ inch. This composite rod was 20% aluminum by weight and the remainder pure copper. These rods, when used in an automatic machine, give perfectly satisfactory metal transfer and a sound, entirely homogeneous alloy deposit having all the characteristics of aluminum-bronze of the proportions of the rod.

An alternative type of rod is produced by braiding, twisting, or otherwise fastening together aluminum and copper elements in the form of wires, or the like, of the respective materials. An advantageous welding rod of this type is prepared from one aluminum wire and two copper wires combined as indicated to form the composite rod. The proportion of aluminum to copper is readily regulated by varying the number and size of the elements of the respective metals.

Each of the wires is very easily fabricated and there is no limit, so far as rod manufacturing is concerned, to the percentage of aluminum in the rod. Being ductile, the component wires are readily braided or twisted together to form the composite rod.

A further type of rod within the contemplation of my present invention is one such as is formed by casting a composite ingot and then rolling and drawing it to the desired size. For instance, aluminum may be cast in a copper cylinder to form an ingot having an aluminum core within a copper jacket. This may be rolled and drawn to the desired rod size.

Typical welding rods embodying my invention are represented by the accompanying drawings in which Figure 1 represents a section of welding rod having a core 3 of aluminum and a sheath 4 of copper. Welding rods of this type are readily formed by wrapping ductile copper about the core of aluminum.

Figure 2:

Figure 2 of the drawing represents a type of welding rod formed by twisting together two copper wires 5 and 6 with an aluminum wire 7. For clarity, the respective wires have been shown as being of equal transverse area, or gauge; but it will be understood that the invention also contemplates the use of wires of different diameters.

It will be recognized that other means of fastening together the aluminum and the copper elements may be used without departing from the spirit of my invention.

The invention provides an inexpensive rod for making aluminum-bronze welds. A composite rod, fabricated in accordance with my present invention, may be used in automatic welding processes to achive different end results by varying the welding conditions to get greater or less dilution or alloying of the weld by the base metal.

My new welding rods may, of course, be made to any desired length. They may be used with particular advantage in welding apparatus adapted to continuous operation and where a coil or reel of the welding metal is employed as a continuous source of welding rod. Aluminum-bronze of the same composition as the welding rod may be readily obtained.

As stated above, the welding rod may be produced by forming an inner core of aluminum with an outer sheath of copper, for instance, as shown in Figure 1 of the drawings. This is especially desirable for the reason that the ratio of aluminum to copper in the composite welding rods is usually relatively small. One may use an aluminum core of uniform size and readily produce welding rods containing greater or less proportions of aluminum by varying the thickness of the copper sheath.

According to the improved method provided by this invention, the copper and the aluminum are simultaneously supplied to the fusion zone of the welding operation, and the aluminum and copper may be thus supplied in a ductile form in the desired relative proportions of aluminum and copper.

In general, my improved composite welding rod is composed of at least one element of aluminum and at least one element of copper, the several elements being uniformly and closely associated with each other throughout the length of the rod, and the relative proportions of aluminum and copper are substantially the same as the relative proportions of these metals in aluminum bronze. For most purposes I prefer to employ elements of aluminum and copper in such relative proportions that the aluminum represents 7½% to 13% by weight and it is to be understood that the proportion of aluminum may be as high as 20%. This invention is particularly valuable in connection with the production of aluminum bronze weld deposits of optimum strength and wear resistance and for such purposes I prefer to combine the copper and aluminum in such relative proportion that the aluminum represents at least 9% but not over 20% by weight.

I claim:

1. A composite welding rod comprising at least one element of aluminum and at least one element of copper, the several elements being uniformly and closely associated throughout the length of the rod and the proportion of aluminum being at least 7.5% but not over 20% by weight.

2. A composite welding rod according to claim 1 in which the several elements are in the form of wires and are twisted together to form a unitary rod.

3. A composite welding rod composed of at least one element of an aluminum-iron alloy and at least one element of cooper, the several elements being uniformly and closely associated throughout the length of the rod and the proportion of aluminum being at least 7.5% but not over 20% by weight and the proportion of iron not exceeding 5% by weight.

4. A composite welding rod composed of at least one element of aluminum and at least one element of a copper-iron alloy, the several elements being uniformly and closely associated throughout the length of the rod and the proportion of aluminum being at least 7.5% but not over 20% by weight and the proportion of iron not exceeding 5% by weight.

5. A composite welding rod composed of at least one element of aluminum, at least one element of copper, and at least one element of iron, the several elements being uniformly and closely associated throughout the length of the rod, the proportion of aluminum being at least 7.5% but not over 20% by weight and the proportion of iron being not more than 5% by weight.

HAROLD ROBINSON.

REFERENCES CITED

The following references are of record in the file of this patent:

UNITED STATES PATENTS

| Number | Name | Date |
|---|---|---|
| 1,437,257 | Mattice | Nov. 28, 1922 |
| 2,184,716 | Hermsen et al. | Dec. 26, 1939 |
| 2,261,779 | Rutt | Nov. 4, 1941 |
| 2,301,320 | Phillips et al. | Nov. 10, 1942 |
| 2,319,977 | Cape et al. | May 25, 1943 |
| 2,320,676 | Swift | June 1, 1943 |
| 2,430,419 | Edens | Nov. 4, 1947 |

FOREIGN PATENTS

| Number | Country | Date |
|---|---|---|
| 302,064 | Great Britain | Dec. 13, 1928 |